(12) United States Patent
Jin

(10) Patent No.: US 7,187,139 B2
(45) Date of Patent: Mar. 6, 2007

(54) SPLIT PHASE INVERTERS FOR CCFL BACKLIGHT SYSTEM

(75) Inventor: Xiaoping Jin, Orange, CA (US)

(73) Assignee: Microsemi Corporation, Irvine, CA (US)

( * ) Notice: Subject to any disclaimer, the term of this patent is extended or adjusted under 35 U.S.C. 154(b) by 89 days.

(21) Appl. No.: 10/903,636

(22) Filed: Jul. 30, 2004

(65) Prior Publication Data

US 2005/0062436 A1    Mar. 24, 2005

Related U.S. Application Data

(60) Provisional application No. 60/501,502, filed on Sep. 9, 2003.

(51) Int. Cl.
*H05B 41/16* (2006.01)

(52) U.S. Cl. ............... 315/274; 315/276; 315/282; 315/279; 315/312

(58) Field of Classification Search ............... None
See application file for complete search history.

(56) References Cited

U.S. PATENT DOCUMENTS

| | | | |
|---|---|---|---|
| 2,429,162 A | 10/1947 | Russell et al. |
| 2,440,984 A | 5/1948 | Summers |
| 2,572,258 A | 10/1951 | Goldfield et al. |
| 2,965,799 A | 12/1960 | Brooks et al. |
| 2,968,028 A | 1/1961 | Eilichi et al. |
| 3,141,112 A | 7/1964 | Eppert |
| 3,611,021 A | 4/1970 | Wallace |
| 3,597,656 A | 8/1971 | Douglas |
| 3,737,755 A | 6/1973 | Calkin et al. |
| 3,742,330 A | 6/1973 | Hodges et al. |
| 3,936,696 A | 2/1976 | Gray |
| 3,944,888 A | 3/1976 | Clark |
| 4,060,751 A | 11/1977 | Anderson |
| 4,388,562 A | 6/1983 | Josephson |
| 4,463,287 A | 7/1984 | Pitel |
| 4,523,130 A | 6/1985 | Pitel |
| 4,572,992 A | 2/1986 | Masaki |
| 4,574,222 A | 3/1986 | Anderson |
| 4,622,496 A | 11/1986 | Dattilo et al. |
| 4,630,005 A | 12/1986 | Clegg et al. |
| 4,663,566 A | 5/1987 | Nagano |
| 4,663,570 A | 5/1987 | Luchaco et al. |
| 4,672,300 A | 6/1987 | Harper |

(Continued)

FOREIGN PATENT DOCUMENTS

| | | |
|---|---|---|
| EP | 0647021 A1 | 9/1994 |
| JP | 06168791 A | 6/1994 |
| JP | 8-204488 | 8/1996 |
| TW | 554643 | 9/2003 |
| WO | WO 94/15444 | 7/1994 |

*Primary Examiner*—Tuyet Thi Vo
(74) *Attorney, Agent, or Firm*—Knobbe, Martens, Olson & Bear, LLP

(57) ABSTRACT

An apparatus and method for driving a lamp are provided. In one embodiment, an inverter having four switching elements is split into two inverter arms that are deployed at separate terminals of a floating lamp structure to achieve even light output. A controller drives both inverter arms such that power switching lines do not cross the floating lamp structure. In one embodiment, the controller adjusts the brightness of the lamp structure by adjusting the phase difference between outputs of a first inverter arm relative to a second inverter arm. In one embodiment, the controller adjusts the brightness by symmetrically pulse width modulating the outputs of the first inverter arm and the second inverter arm.

23 Claims, 12 Drawing Sheets

U.S. PATENT DOCUMENTS

| | | | |
|---|---|---|---|
| 4,675,574 A | 6/1987 | Delflache | |
| 4,686,615 A | 8/1987 | Ferguson | |
| 4,698,554 A | 10/1987 | Stupp et al. | |
| 4,761,722 A | 8/1988 | Pruitt | |
| 4,766,353 A | 8/1988 | Burgess | |
| 4,780,696 A | 10/1988 | Jirka | |
| 4,847,745 A | 7/1989 | Shekhawat | |
| 4,862,059 A | 8/1989 | Tominaga et al. | |
| 4,939,381 A | 7/1990 | Shibata | |
| 5,023,519 A | 6/1991 | Jensen | |
| 5,030,887 A | 7/1991 | Guisinger | |
| 5,036,255 A | 7/1991 | McKnight et al. | |
| 5,057,808 A | 10/1991 | Dhyanchand | |
| 5,173,643 A | 12/1992 | Sullivan et al. | |
| 5,349,272 A | 9/1994 | Rector | |
| 5,434,447 A | 7/1995 | Crouse et al. | |
| 5,475,284 A | 12/1995 | Lester et al. | |
| 5,485,057 A | 1/1996 | Smallwood et al. | |
| 5,519,289 A | 5/1996 | Katyl et al. | |
| 5,539,281 A | 7/1996 | Shackle et al. | |
| 5,557,249 A | 9/1996 | Reynal | |
| 5,563,473 A | 10/1996 | Mattas et al. | |
| 5,574,335 A | 11/1996 | Sun | |
| 5,574,356 A | 11/1996 | Parker | |
| 5,615,093 A | 3/1997 | Nalbant | |
| 5,619,402 A | 4/1997 | Lin | |
| 5,621,281 A | 4/1997 | Kawabata et al. | |
| 5,652,479 A | 7/1997 | LoCascio et al. | |
| 5,712,776 A | 1/1998 | Palara et al. | |
| 5,754,012 A | 5/1998 | LoCascio | |
| 5,818,172 A | 10/1998 | Lee | |
| 5,822,201 A | 10/1998 | Kijima | |
| 5,825,133 A | 10/1998 | Conway | |
| 5,828,156 A | 10/1998 | Roberts | |
| 5,892,336 A | 4/1999 | Lin et al. | |
| 5,910,713 A | 6/1999 | Nishi et al. | |
| 5,912,812 A | 6/1999 | Moriarty, Jr. | |
| 5,914,842 A | 6/1999 | Sievers | |
| 5,923,129 A | 7/1999 | Henry | |
| 5,930,121 A | 7/1999 | Henry | |
| 5,936,360 A | 8/1999 | Kaneko | |
| 6,002,210 A | 12/1999 | Nilssen | |
| 6,020,688 A | 2/2000 | Moisin | |
| 6,028,400 A | 2/2000 | Pol et al. | |
| 6,037,720 A | 3/2000 | Wong et al. | |
| 6,038,149 A | 3/2000 | Hiraoka et al. | |
| 6,040,662 A | 3/2000 | Asayama | |
| 6,043,609 A | 3/2000 | George et al. | |
| 6,049,177 A | 4/2000 | Felper | |
| 6,072,282 A | 6/2000 | Adamson | |
| 6,104,146 A | 8/2000 | Chou et al. | |
| 6,108,215 A | 8/2000 | Kates et al. | |
| 6,114,814 A | 9/2000 | Shannon et al. | |
| 6,121,733 A | 9/2000 | Nilssen | |
| 6,127,785 A | 10/2000 | Williams | |
| 6,127,786 A | 10/2000 | Moisin | |
| 6,137,240 A | 10/2000 | Bogdan | |
| 6,150,772 A | 11/2000 | Crane | |
| 6,169,375 B1 | 1/2001 | Moisin | |
| 6,181,066 B1 | 1/2001 | Adamson | |
| 6,181,083 B1 | 1/2001 | Moisin | |
| 6,181,084 B1 | 1/2001 | Lau | |
| 6,188,553 B1 | 2/2001 | Moisin | |
| 6,198,234 B1 | 3/2001 | Henry | |
| 6,198,236 B1 | 3/2001 | O'Neill | |
| 6,198,238 B1 | 3/2001 | O'Neill | |
| 6,215,256 B1 | 4/2001 | Ju | |
| 6,218,788 B1 | 4/2001 | Chen et al. | |
| 6,259,615 B1 | 7/2001 | Lin | |
| 6,281,636 B1 | 8/2001 | Okutsu et al. | |
| 6,281,638 B1 | 8/2001 | Moisin | |
| 6,307,765 B1 | 10/2001 | Choi | |
| 6,310,444 B1 | 10/2001 | Chang | |
| 6,316,881 B1 | 11/2001 | Shannon et al. | |
| 6,320,329 B1 | 11/2001 | Wacyk | |
| 6,323,602 B1 | 11/2001 | De Groot et al. | |
| 6,344,699 B1 | 2/2002 | Rimmer | |
| 6,362,577 B1 | 3/2002 | Ito et al. | |
| 6,396,722 B2 | 5/2002 | Lin | |
| 6,417,631 B1 | 7/2002 | Chen et al. | |
| 6,420,839 B1 | 7/2002 | Chiang et al. | |
| 6,433,492 B1 | 8/2002 | Buonavita | |
| 6,445,141 B1 | 9/2002 | Kastner et al. | |
| 6,459,215 B1 | 10/2002 | Nerone et al. | |
| 6,459,216 B1 | 10/2002 | Tsai | |
| 6,469,922 B2 | 10/2002 | Choi | |
| 6,472,827 B1 | 10/2002 | Nilssen | |
| 6,472,876 B1 | 10/2002 | Notohamiprodjo et al. | |
| 6,486,618 B1 | 11/2002 | Li | |
| 6,494,587 B1 | 12/2002 | Shaw et al. | |
| 6,501,234 B2 | 12/2002 | Lin et al. | |
| 6,509,696 B2 | 1/2003 | Bruning et al. | |
| 6,515,427 B2 | 2/2003 | Oura et al. | |
| 6,515,881 B2 | 2/2003 | Ikuhara et al. | |
| 6,531,831 B2 | 3/2003 | Chou et al. | |
| 6,534,934 B1 | 3/2003 | Lin et al. | |
| 6,559,606 B1 | 5/2003 | Chou et al. | |
| 6,570,344 B2 | 5/2003 | Lin | |
| 6,628,093 B2 | 9/2003 | Stevens | |
| 6,633,138 B2 | 10/2003 | Shannon et al. | |
| 6,717,371 B2 | 4/2004 | Lin et al. | |
| 6,717,372 B2 | 4/2004 | Lin et al. | |
| 6,765,354 B2 | 7/2004 | Klien | |
| 6,781,325 B2 | 8/2004 | Lee | |
| 6,784,627 B2 | 8/2004 | Suzuki et al. | |
| 6,804,129 B2 | 10/2004 | Lin | |
| 6,870,330 B2 | 3/2005 | Choi | |
| 6,922,023 B2 | 7/2005 | Hsu et al. | |
| 6,936,975 B2 * | 8/2005 | Lin et al. | 315/224 |
| 2001/0036096 A1 | 11/2001 | Lin | |
| 2002/0030451 A1 | 3/2002 | Moisin | |
| 2002/0097004 A1 | 7/2002 | Chiang et al. | |
| 2002/0135319 A1 | 9/2002 | Bruning et al. | |
| 2002/0140538 A1 | 10/2002 | Yer | |
| 2002/0145886 A1 | 10/2002 | Stevens | |
| 2002/0171376 A1 | 11/2002 | Rust et al. | |
| 2002/0180380 A1 | 12/2002 | Lin | |
| 2002/0180572 A1 | 12/2002 | Kakehashi et al. | |
| 2002/0181260 A1 | 12/2002 | Chou et al. | |
| 2002/0195971 A1 | 12/2002 | Qian et al. | |
| 2003/0001524 A1 | 1/2003 | Lin et al. | |
| 2003/0080695 A1 | 5/2003 | Ohsawa | |
| 2003/0090913 A1 | 5/2003 | Che-Chen et al. | |
| 2004/0032223 A1 | 6/2003 | Henry | |
| 2003/0117084 A1 | 7/2003 | Stack | |
| 2003/0141829 A1 | 7/2003 | Yu | |
| 2004/0155596 A1 | 8/2004 | Ushijima | |
| 2004/0257003 A1 | 12/2004 | Hsieh et al. | |
| 2004/0263092 A1 * | 12/2004 | Liu | 315/247 |
| 2005/0093471 A1 | 5/2005 | Jin | |
| 2005/0093472 A1 | 5/2005 | Jin | |
| 2005/0093482 A1 | 5/2005 | Ball | |
| 2005/0093483 A1 | 5/2005 | Ball | |
| 2005/0093484 A1 | 5/2005 | Ball | |
| 2005/0094372 A1 | 5/2005 | Jin | |
| 2005/0099143 A1 | 5/2005 | Kohno | |
| 2005/0225261 A1 | 10/2005 | Jin | |
| 2006/0022612 A1 | 2/2006 | Henry | |

* cited by examiner

SPLIT PHASE INVERTERS FOR CCFL BACKLIGHT SYSTEM

CLAIM FOR PRIORITY

This application claims the benefit of priority under 35 U.S.C. § 119(e) of U.S. Provisional Application No. 60/501,502 filed on Sep. 9, 2003 and entitled "SPLIT PHASE INVERTERS FOR CCFL BACKLIGHT SYSTEM," the entirety of which is incorporated herein by reference.

BACKGROUND OF THE INVENTION

1. Field of the Invention

The present invention relates to power inverter circuits for driving fluorescent lamps such as cold cathode fluorescent lamps (CCFLs) or the like. More specifically, the present invention relates to a split phase topology for power inverter circuits.

2. Description of the Related Art

Fluorescent lamps are used in a number of applications including, for example, backlighting for display screens, or the like. One particular type of fluorescent lamp is a cold cathode fluorescent lamp (CCFL). Such lamps require a high starting voltage (typically on the order of 700 to 1,600 volts) for a short period of time to ionize the gas contained within the lamp tubes and fire or ignite the lamp. This starting voltage may be referred to herein as a strike voltage or striking voltage. After the gas in a CCFL is ionized and the lamp is fired, less voltage is needed to keep the lamp on.

In liquid crystal display (LCD) applications, backlight is needed to illuminate the screen to make a visible display. Backlight systems in LCD or other applications typically include one or more lamps and an inverter system to provide DC to AC power conversion and to control the brightness of the lamps. Even brightness across the lamps and clean operation of inverters with low switching stresses, low EMI, and low switching losses are desirable. However, increases in lamp length, wire length and operating voltage associated with large backlighting systems make even luminance difficult to achieve. Even luminance across non-floating lamp structures is even more difficult. Thus, some backlight inverter systems are configured to support floating lamp structures.

The size of LCD display panels are increasing with the increasing size of large screen displays such as those associated with large screen TVs, desktop monitors, or the like. As the size of LCD display panels increase, the size of their backlighting systems also increase. The associated increase in power level of the backlight inverter systems exacerbates problems typically found in conventional half-bridge and push-pull inverter topologies. These problems may include, for example, switching spikes, high voltage/current stresses, switching losses, electromagnetic interference, combinations of the forgoing, or the like.

A number of conventional inverter topologies facilitate zero-voltage or zero current switching to reduce switching stresses and losses. These inverter topologies include, for example, an active clamping forward topology, a phase shifted full-bridge topology, a resonant full-bridge topology, an asymmetric half-bridge topology.

A factor in achieving even brightness over a lamp is the ability to symmetrically power the lamp at both ends. This is more difficult to achieve as the length of the lamp increases. Among the conventional inverter topologies, the phase shifted full-bridge topology and the resonant full-bridge topology are acceptable for CCFL inverter applications because of their ability to produce symmetric lamp current waveforms. However, there are some disadvantages associated with resonant type inverters including, for example, high amplitude of voltage or current excursion, variable operating frequency, or the like. These disadvantages are not desirable in many lamp applications.

FIG. 1 illustrates a conventional backlight system 100 for powering a lamp 102. The lamp 102 is coupled between the secondary winding of a first transformer 104 and the secondary winding of a second transformer 106. The primary winding of the first transformer 104 and the primary winding of the second transformer 106 are coupled to an switching network 110 through two switching power lines 112, 114. The switching network 110 comprises four power MOSFETS (metal oxide semiconductor field effect transistors) 120, 122, 124, 126 connected in a full-bridge topology to provide DC to AC conversion. The four power MOSFETS 120, 122, 124, 126 are coupled to DC power lines V+, V−. The disadvantage of the configuration shown in FIG. 1 is that high current or high voltage switching lines 112, 114 typically have to cross a display panel.

When the length of the lamp 102 increases with the panel size, the configuration shown in FIG. 2 may be used to avoid running long switching power lines across the length of the panel. The configuration shown in FIG. 2 powers a lamp 202 by using separate inverters 204, 206 at respective ends of the lamp 202. Both inverters 204, 206 use a full-bridge switching topology. Thus, as compared to the inverter shown in FIG. 1, the power devices and associated component count, including controllers 240, 242, is doubled. Increasing the number of components increases the cost and surface area of a printed circuit board using the product. Thus, the total size of the product is increased.

SUMMARY OF THE INVENTION

The present invention proposes a split phase inverter to drive floating lamps symmetrically with zero-voltage switching operation and reduced device count. For example, a floating lamp structure can be driven by two power stages near the respective lamp terminals. In one embodiment, the split phase inverter enables zero-voltage switching with two-transistor power stages and uses phase shift modulation or pulse width modulation (PWM) to control the lamp current. Voltage/current stresses, electromagnetic interference, switching losses and component count are thereby minimized.

In one embodiment, a four-switch element inverter splits into two two-switch inverter arms to form a split phase inverter (or split inverter). The inverter arms (or split switching arms) are deployed separately at two respective separate terminals of a floating CCFL to achieve even light output. Each of the split switching arms is dedicated to driving a separate terminal of the CCFL. Both split switching arms are controlled by a common controller. Thus, the advantages of a full-bridge inverter circuit are achieved with half the number of components, including the inverter controller.

A novel regulation method facilitates full lamp current regulation for wide input range conditions. For example, the lamp current regulation can be achieved with fixed-frequency, zero-voltage switching operations by controlling the switching pattern of each dedicated two-switch network and the waveform relations between them (e.g., by utilizing a complementary switching strategy with an optimized dead time insertion). In one embodiment, an optimized dead time is inserted at switch over transitions between the two switches of a two-switch inverter arm to avoid shoot through conditions.

In one embodiment, a novel split inverter is used for backlight systems in large LCD display panel applications (e.g., 46" LCD televisions, desktop monitor or the like). The split inverter includes two-transistor switching networks respectively dedicated to providing AC signals at separate lamp terminals. The novel split inverter provides very clean switching waveforms and high efficiency (e.g., approximately 91%). The novel split inverter advantageously uses half the number of MOSFET devices, has a smaller packaging size, and runs cooler than competitive inverters for the same application.

In one embodiment, the split inverter is configured to drive more than one floating lamp. For example, multiple lamps can be driven in parallel. The two-transistor switching networks (or split inverter arms) can be in a half bridge configuration, a push-pull configuration, a push-pull forward configuration, or the like.

In one embodiment, the switching operations of the split inverter arms are synchronized. The output connections of the two-switch inverter arms are arranged such that voltages applied to the two opposite terminals of the lamps are in an anti-phase relationship. The respective outputs of the split inverter arms add up differentially to drive the lamps. Lamp current regulation is achieved by controlling either the phase relationship or the pulse pattern between the outputs of the split inverter arms.

In one embodiment, the split inverter arms operate in a complementary switching pattern, and the regulation of the lamp current is fulfilled by adjusting the phase angle or the symmetric pulse width between the respective outputs of the split inverter arms. Since the transformers are substantially similar, and the split inverter arms share substantially the same input voltage, the output voltages of the split inverter arms cancel each other when their switching states are in phase. Similarly, the two output voltages stack up to drive the lamps when the switching states are out of phase (or anti-phase).

One inverter controller (i.e., a common controller) can generate the control signals for both split inverter arms because a symmetric pair of switching waveforms is used. In an exemplary embodiment, a phase shift modulation scheme is used in which the split inverter arms switch at near 50% duty cycle (e.g., at substantially 50% duty cycle with dead time insertions), and the effective voltage across the lamps varies substantially with the phase difference of the respective output voltages generated by the split inverter arms. By adjusting the phase difference between the split inverter arms, the voltage across the lamps and the corresponding lamp current can be regulated.

In an exemplary embodiment, a pulse width modulation scheme is used in which switching patterns for the split inverter arms have symmetric pulse widths but not necessarily at near 50% duty cycle. The effective lamp voltage varies with the pulse widths of the respective output voltages generated by the split inverter arms. The lamp current can be regulated by symmetrically adjusting the pulse widths.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The present invention will be described below in connection with the accompanying drawings in which.

DETAILED DESCRIPTION OF THE PREFERRED EMBODIMENTS

The present invention provides a technique for driving floating lamps symmetrically with reduced device count. In one embodiment, a floating lamp structure is driven by two dedicated power stages disposed proximate the respective lamp terminals. In one embodiment, the dedicated power stages are two-transistor switching networks. A novel pulse width modulation (PWM) scheme or phase shift modulation may be used to control the lamp current. The technique reduces voltage stresses, current stresses, electromagnetic interference, switching losses and component count.

In one embodiment, a four-switching element inverter is split into two inverter arms, which are deployed separately at two respective terminals of a floating cold cathode fluorescent lamp (CCFL) structure to achieve even light output. The advantages of a full-bridge inverter circuit are achieved with half the number of components, including the inverter controller. A novel regulation method facilitates full lamp current regulation for wide input range conditions. The lamp current regulation can be achieved with fixed frequency, zero-voltage switching operations by controlling the switching pattern of each arm and the waveform relations between the arms. As discussed in greater detail below, this is achieved by utilizing a complementary switching strategy with an optimized dead-time insertion.

In one embodiment, a split inverter is used in backlight systems for large display panels such as those associated with large screen televisions (e.g., having approximately a 46 inch LCD display or greater), desktop monitors or the like. The split inverter provides very clean switching waveforms and high efficiency (e.g., 91% efficiency or greater). The split inverter advantageously uses half the number of switching devices (e.g., MOSFETs), has a smaller packaging size and runs cooler than conventional inverters for the same applications.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent components and methods to those described herein. In other instances, well-known components and methods have not been described in detail so as not to unnecessarily obscure aspects of the present invention.

Figure 3:
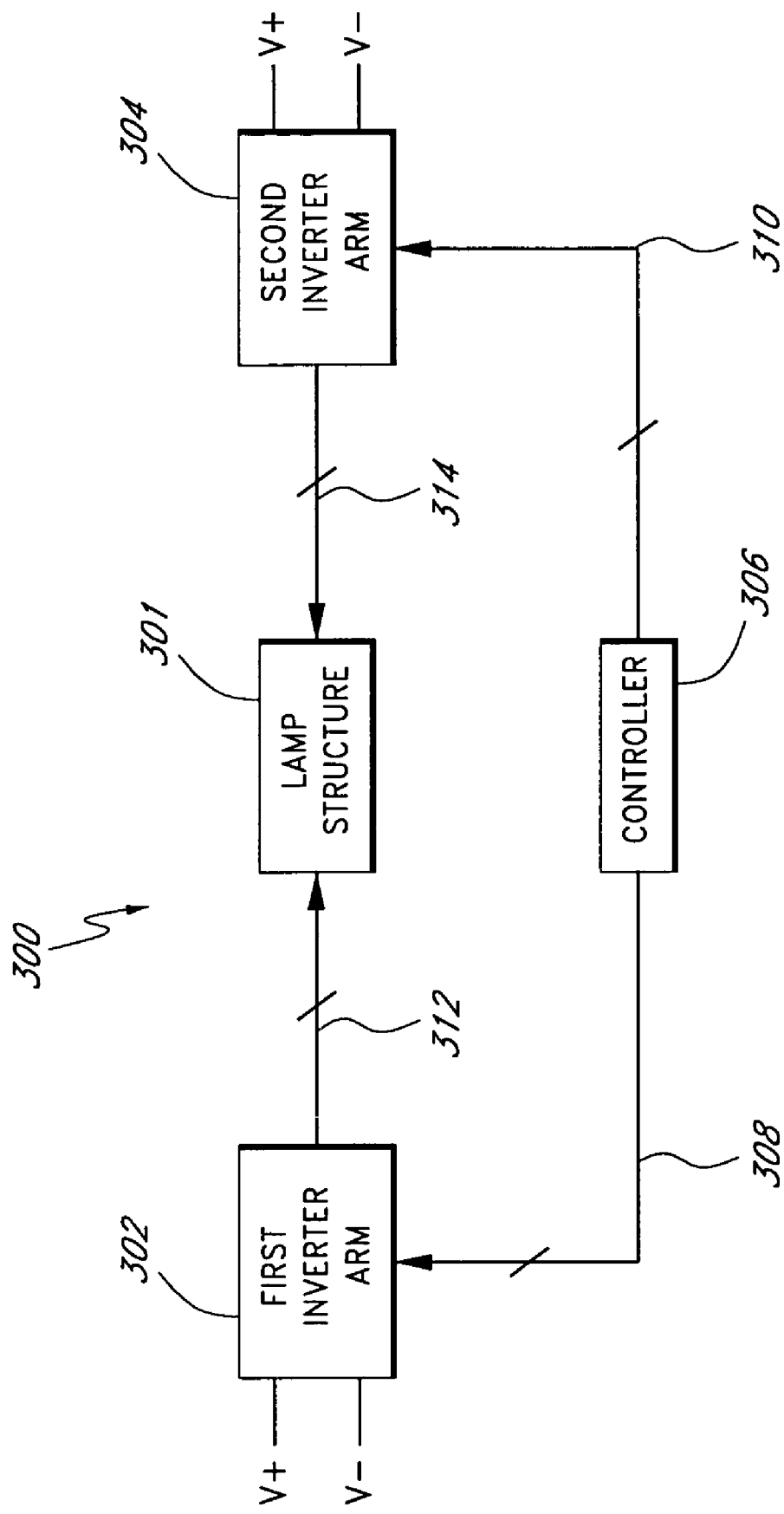
FIG. 3 is a block diagram illustrating a split inverter system according to an embodiment of the invention.

FIG. 3 is a block diagram illustrating a split inverter system 300 according to an embodiment of the invention. The split inverter system 300 includes a lamp structure 301 coupled between a first inverter arm 302 and a second inverter arm 304. In an exemplary embodiment, the lamp structure 301 includes one or more CCFLs (not shown) in a floating configuration. As used herein, "floating" refers to its normal and customary meaning and includes electrically isolating the lamp structure 301 from ground or any direct connection to the driving circuitry (i.e., the first inverter arm 302 and the second inverter arm 304). For example, the first inverter arm 302 and the second inverter arm 304 may include respective transformers used to isolate and inductively couple power to the lamp structure 301.

In one embodiment, the first inverter arm 302 and the second inverter arm 304 each comprise a two-switch network configured to convert a direct current (DC) voltage (represented by V+ and V−) to an alternating current (AC) signal. The first inverter arm 302 is configured to provide a first AC signal to a first terminal 312 of the lamp structure 301 and the second inverter arm 304 is configured to provide a second AC signal to a second terminal 314 of the lamp structure 301. The first AC signal and the second AC signal add up differentially to drive the lamp structure 301. Thus, the first inverter arm 302 and the second inverter arm 304 operate as complementary power stages at both ends of the lamp structure 301. As discussed in more detail below, the characteristics of the AC lamp voltage (Vlmp) are adjusted by synchronously modulating the first AC signal and the second AC signal.

The first inverter arm 302 is dedicated to and placed proximate the first terminal 312. Similarly, the second inverter arm 304 is dedicated to and placed proximate the second terminal 314. Thus, power switching lines do not cross the length of the lamp structure 301 or a substantial portion thereof. When the split inverter system 300 is used to provide backlighting for a display panel, for example, there are no power switching lines associated with the backlighting system crossing the display panel and causing high EMI, high switching stresses and high switching losses. Thus, the performance of the backlighting system and display panel is improved.

Figure 1:
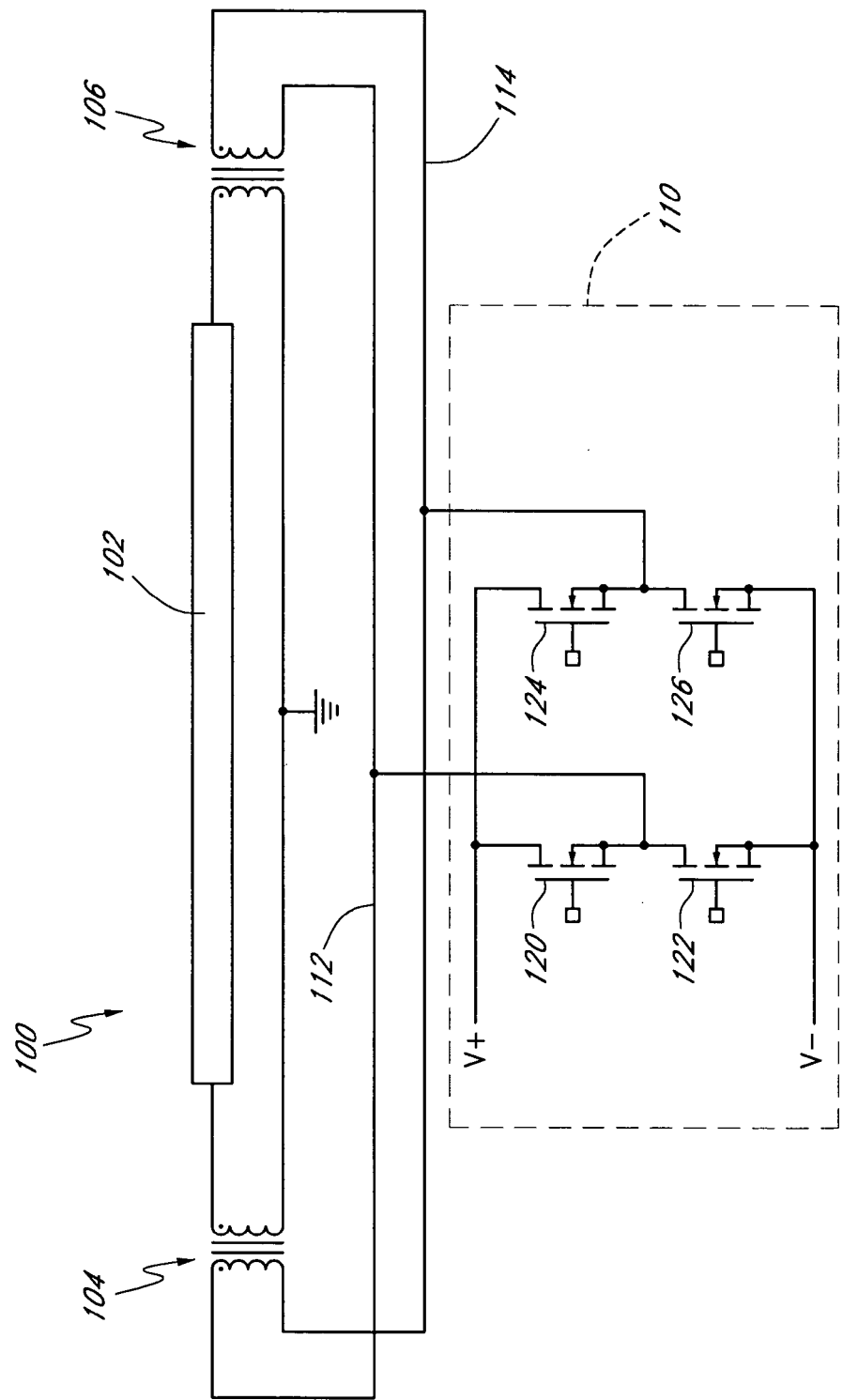
FIG. 1 is a schematic of a conventional backlight system for powering a lamp using a full-bridge inverter.
Figure 2:
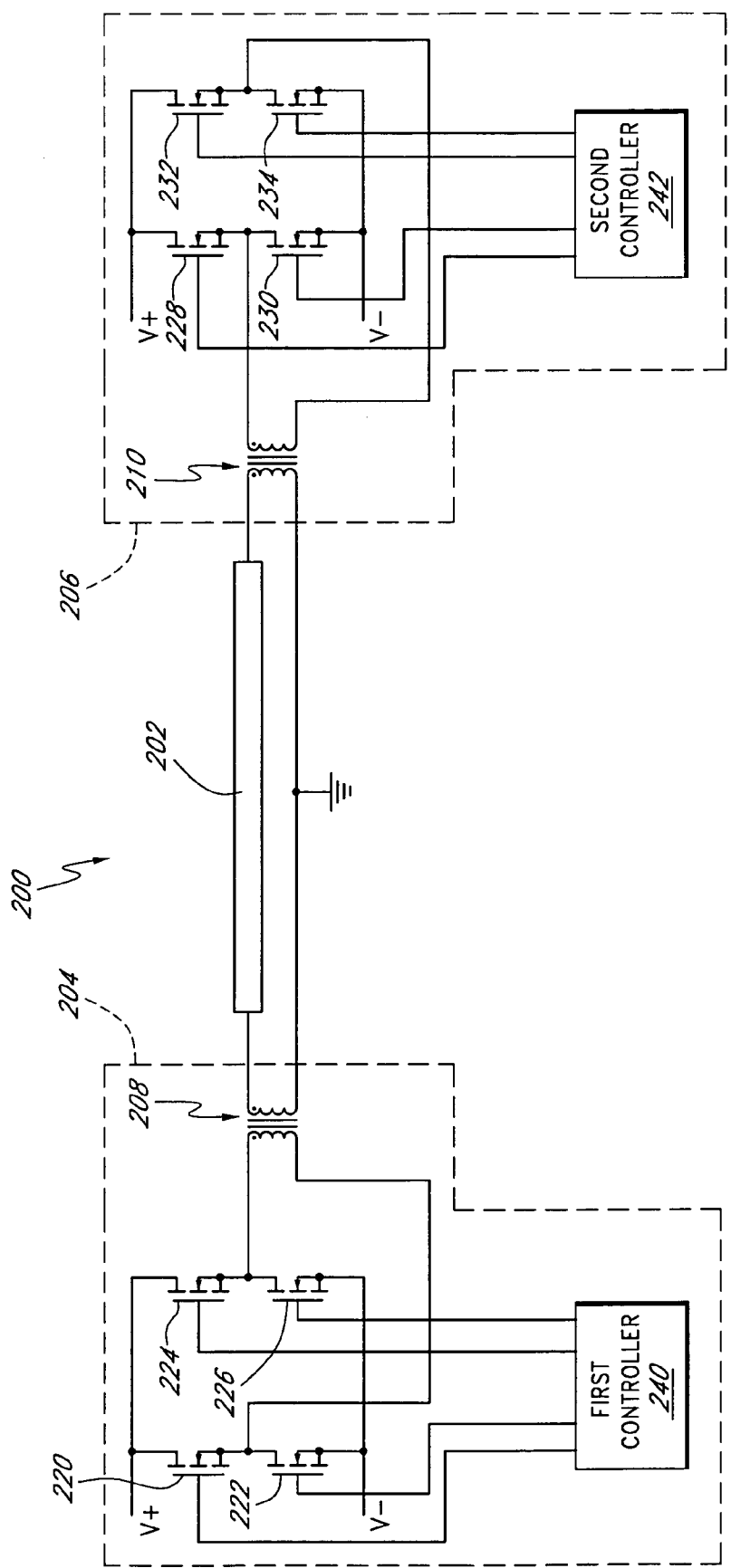
FIG. 2 is a schematic of a conventional backlight system for powering a lamp using two full-bridge inverters.

The split inverter system 300 also includes a common controller 306 coupled to the first inverter arm 302 and the second inverter arm 306 through respective signal lines 308, 310. Preferably, the signal lines 308, 310 have relatively low voltage, low EMI, and low losses as compared to the first terminal 312 and the second terminal 314 of the lamp structure 301. Although two separate controllers can be used to drive the first inverter arm 302 and the second inverter arm 304, in a preferred embodiment the common controller 306 is configured to drive both the first inverter arm 302 and the second inverter arm 304. Since a separate controller is not required for each inverter arm 302, 304, the total number of components and the cost of the split inverter system are reduced as compared, for example, to the conventional backlighting system 200 shown in FIG. 2.

The controller 306 comprises, by way of example, one or more processors, ASICs or other substrate configurations, hardware, program logic, or software capable of representing data and instructions which operate as described herein or similar thereto. The controller 306 may also comprise controller circuitry, processor circuitry, general purpose single-chip or multiple-chip microprocessors, digital signal processors, embedded microprocessors, microcontrollers, combinations of the foregoing, or the like. In operation, the controller 306 controls the first inverter arm 302 and the second inverter arm 304 such that the lamp structure 301 is driven with symmetrical AC signals at both ends. The controller 306 controls the brightness of the lamp structure 301 by modulating or adjusting the symmetrical AC signals relative to one another.

In one embodiment, the controller 306 is configured to synchronize the switching operations of the first inverter arm 302 and the second inverter arm 304. The output connections of the two inverter arms 302, 304 are arranged such that voltages applied to the two opposite terminals 312, 314 of the lamp structure 301 are in an anti-phase relationship. The lamp structure 310 is powered symmetrically at both terminals 312, 314 to obtain even brightness over substantially the whole lamp structure 310. Lamp current regulation is achieved by controlling either the phase relationship or the pulse pattern between the two outputs as explained in more detail below.

Figure 4A:
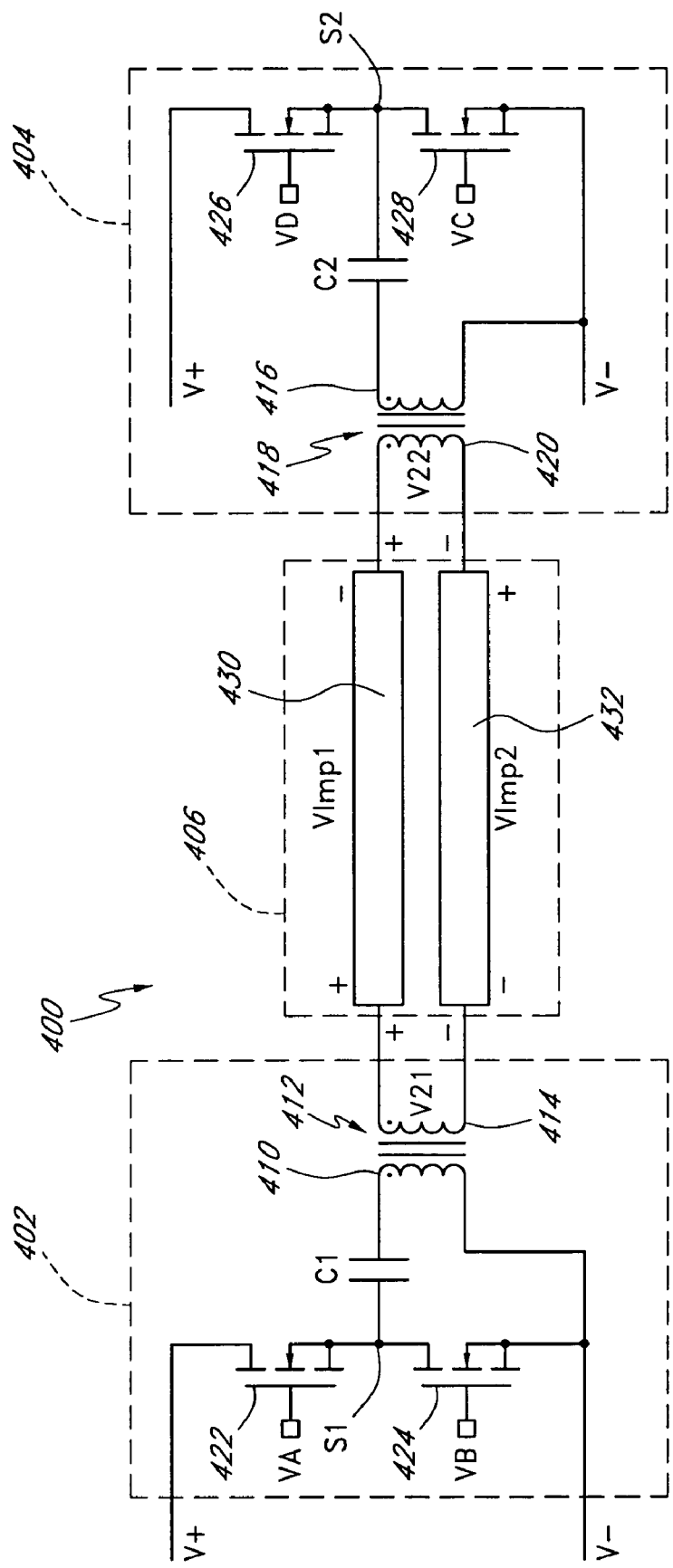
FIG. 4A illustrates one embodiment of a split inverter using half-bridge inverter arms.

FIGS. 4A–6B are partial schematic diagrams illustrating components of exemplary split inverter systems, usable by the split inverter system 300 shown in FIG. 3, according to embodiments of the invention. FIGS. 4A and 4B illustrate a split inverter system 400 comprising a first half-bridge inverter arm 402 and a second half-bridge inverter arm 404 disposed at opposite ends of a corresponding lamp structure 406 (FIG. 4A) or 408 (FIG. 4B). The first half-bridge inverter arm 402 comprises a first output transformer 412 having a primary winding 410 and a secondary winding 414. The first half-bridge inverter arm 402 is configured to generate a first AC signal V21 across the secondary winding 414 of the first output transformer 412. The second half-bridge inverter arm 404 comprises a second output transformer 418 having a primary winding 416 and a secondary winding 420. The second half-bridge inverter arm 404 is configured to generate a second AC signal V22 across the secondary winding 420 of the second output transformer 418.

In one embodiment, the first half-bridge inverter arm 402 comprises a first N-channel MOSFET 422 and a second N-channel MOSFET 424 coupled in series across a supply voltage (i.e., V+ and V−). The first N-channel MOSFET 422 has a drain coupled to a first DC voltage signal V+ (or positive supply) and a source coupled to a first switching node S1. The second N-channel MOSFET 424 has a drain coupled to the first switching node S1 and a source coupled to a second DC voltage signal V− (or negative supply). In some embodiments, the second DC voltage signal V− is a ground or common signal. The first switching node S1 is AC coupled to a first terminal of the primary winding 410 of the first output transformer 412 through a capacitor C1. A second terminal of the primary winding 410 is coupled to the second DC voltage signal V−.

The second half-bridge inverter arm 404 comprises a third N-channel MOSFET 426 and a fourth N-channel MOSFET 428 coupled in series across the supply voltage. The third N-channel MOSFET 426 has a drain coupled to the first DC voltage signal V+ and a source coupled to a second switching node S2. The fourth N-channel MOSFET 428 has a drain coupled to the second switching node S2 and a source coupled to the second DC voltage signal V−. The second switching node S2 is AC coupled to a first terminal of the primary winding 416 of the second output transformer 418 through a capacitor C2. A second terminal of the primary winding 416 is coupled to the second DC voltage signal V−.

The gates of the first MOSFET 422 and the second MOSFET 424 receive control signals VA, VB from a common controller (not shown) configured to drive the first half-bridge inverter arm 402 so as to generate the first AC signal V21. Similarly, the gates of the third MOSFET 426 and the fourth MOSFET 428 receive control signals VC, VD from the common controller configured to drive the second half-bridge inverter arm 404 so as to generate the second AC signal V22. While separate controllers can be used to drive the first half-bridge inverter arm 402 and the second half-bridge inverter arm 404, in a preferred embodiment the common controller drives both arms 402, 404. Thus, the size and cost of the split inverter system 400 are reduced and the characteristics of the first AC signal V21 and the second AC signal V22 can be symmetrically adjusted relative to each other.

FIG. 4A illustrates the lamp structure 406 according to an embodiment of the invention coupled between the secondary winding 414 of the first output transformer 412 and the secondary winding 420 of the second output transformer 418. The lamp structure 406 comprises a first CCFL 430 and a second CCFL 432 coupled between respective terminals of the secondary windings 414, 420 in a floating configuration wherein the terminals of the secondary windings 414, 420 are not grounded. The first AC signal V21 and the second AC signal V22 combine to generate a lamp voltage (Vlmp=Vlmp1+Vlmp2) across the first CCFL 430 and the second CCFL 432.

Figure 4B:
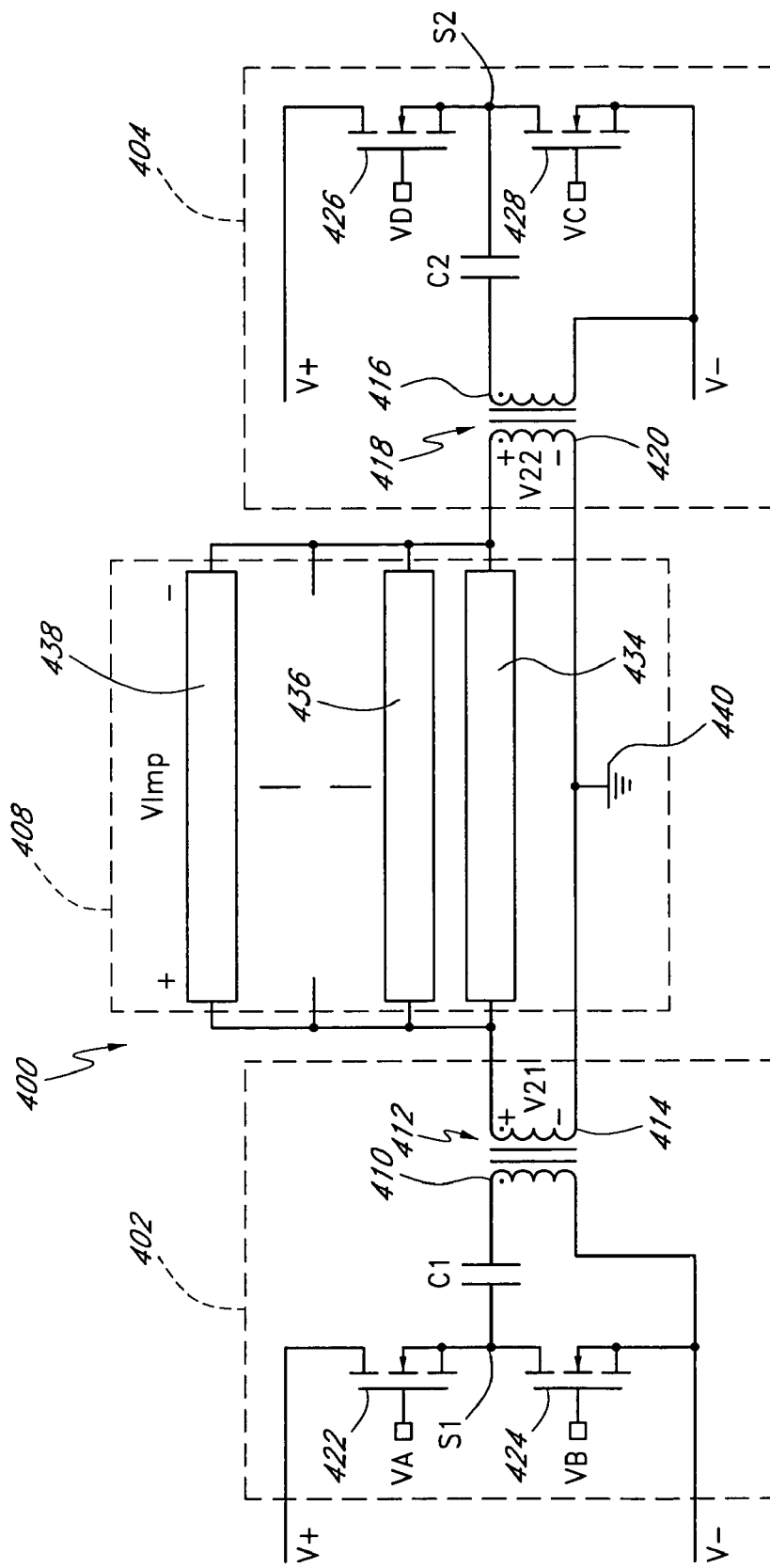
FIG. 4B illustrates another embodiment of a split inverter using half-bridge inverter arms.

FIG. 4B illustrates the lamp structure 408 according to an embodiment of the invention coupled between the secondary winding 414 of the first output transformer 412 and the secondary winding 420 of the second output transformer 418. The lamp structure 408 comprises three CCFLs 434, 436, 438 coupled in parallel between respective first terminals of the secondary windings 414, 420. An artisan will recognize from the disclosure herein that the lamp structure 408 is not limited to the three CCFLs 434, 436, 438 and that any number of lamps can be used including, for example, a single CCFL 434. Respective second terminals of the secondary windings 414, 420 are coupled together. As shown in FIG. 4B, the second terminals of the secondary windings 414, 420 may be connected to ground 440. In alternative embodiments, the second terminals of the secondary windings 414, 420 are not connected to ground 440 and are left floating. The first AC signal V21 and the second AC signal V22 combine to generate a lamp voltage (Vlmp) across the one or more CCFLs 434, 436, 438.

Figure 5A:
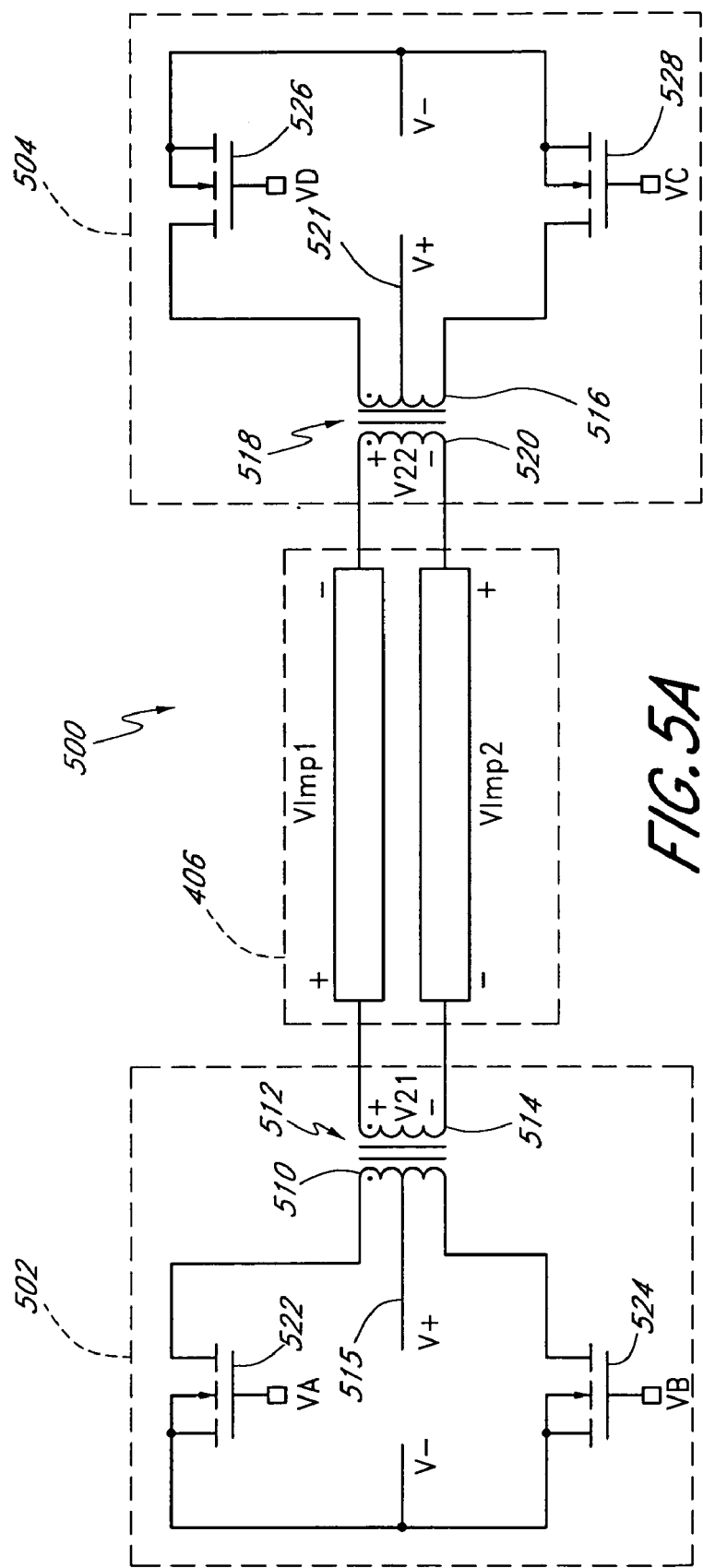
FIG. 5A illustrates one embodiment of a split inverter using push-pull inverter arms.
Figure 5B:
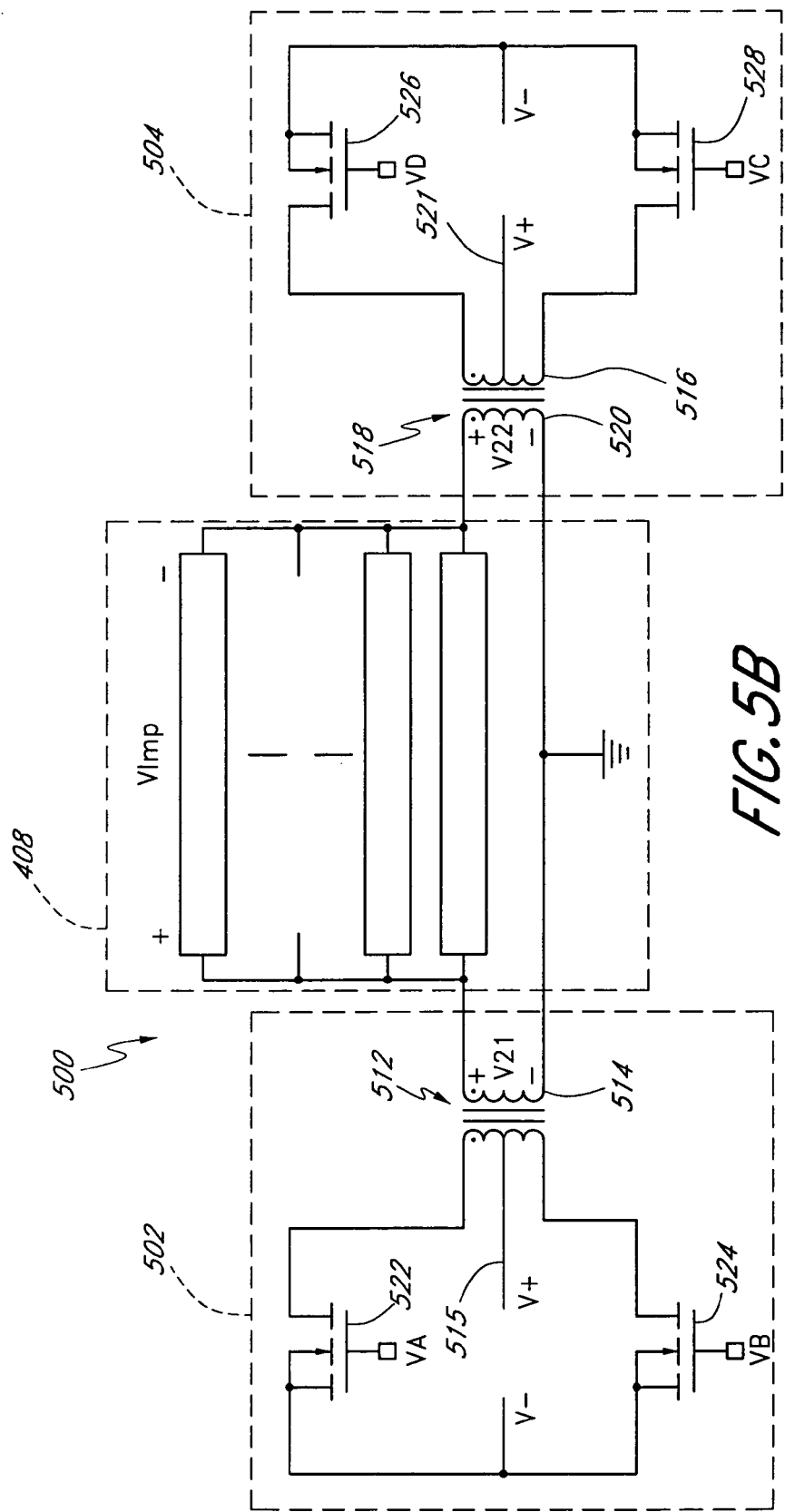
FIG. 5B illustrates another embodiment of a split inverter using push-pull inverter arms.

FIGS. 5A and 5B illustrate a split inverter system 500 comprising a first push-pull inverter arm 502 and a second push-pull inverter arm 504 disposed at opposite ends of a corresponding lamp structure 406 (FIG. 5A) or 408 (FIG. 5B). The lamp structure 406 shown in FIG. 5A is described above with respect to FIG. 4A. The lamp structure 408 shown in FIG. 5B is described above with respect to FIG. 4B.

The first push-pull inverter arm 502 comprises a first output transformer 512 having a primary winding 510 and a secondary winding 514. The first push-pull inverter arm 502 is configured to generate a first AC signal V21 across the secondary winding 514 of the first output transformer 512. The primary winding 510 includes a center tap 515 coupled to a first DC voltage signal V+. The second push-pull inverter arm 504 comprises a second output transformer 518 having a primary winding 516 and a secondary winding 520. The second push-pull inverter arm 504 is configured to generate a second AC signal V22 across the secondary winding 520 of the second output transformer 518. The primary winding 516 includes a center tap 521 coupled to the first DC voltage signal V+.

The first push-pull inverter arm 502 comprises a first semiconductor switch (e.g., N-channel MOSFET) 522 and a second semiconductor switch (e.g., N-channel MOSFET) 524 with respective drains coupled to opposite terminals of the primary winding 510 of the first output transformer 512 and sources coupled to a second DC voltage signal V−. In some embodiments, the second DC voltage signal V− is a ground or common signal. The second push-pull inverter arm 504 comprises a third semiconductor switch (e.g., N-channel MOSFET) 526 and a fourth semiconductor switch (e.g., N-channel MOSFET) 528 with respective drains coupled to opposite terminals of the primary winding 516 of the second output transformer 518 and sources coupled to the second DC voltage signal V−.

The gates of the first MOSFET 522 and the second MOSFET 524 receive control signals VA, VB from a controller (not shown) configured to drive the first push-pull inverter arm 502 so as to generate the first AC signal V21. Similarly, the gates of the third MOSFET 526 and the fourth MOSFET 528 receive control signals VC, VD from the controller configured to drive the second push-pull inverter arm 504 so as to generate the second AC signal V22. While separate controllers can be used to drive the first push-pull inverter arm 502 and the second push-pull inverter arm 504, in a preferred embodiment a common controller drives both arms 502, 504. Thus, the size and cost of the split inverter system 500 are reduced and the characteristics of the first AC signal V21 and the second AC signal V22 can be adjusted relative to each other.

Figure 6A:
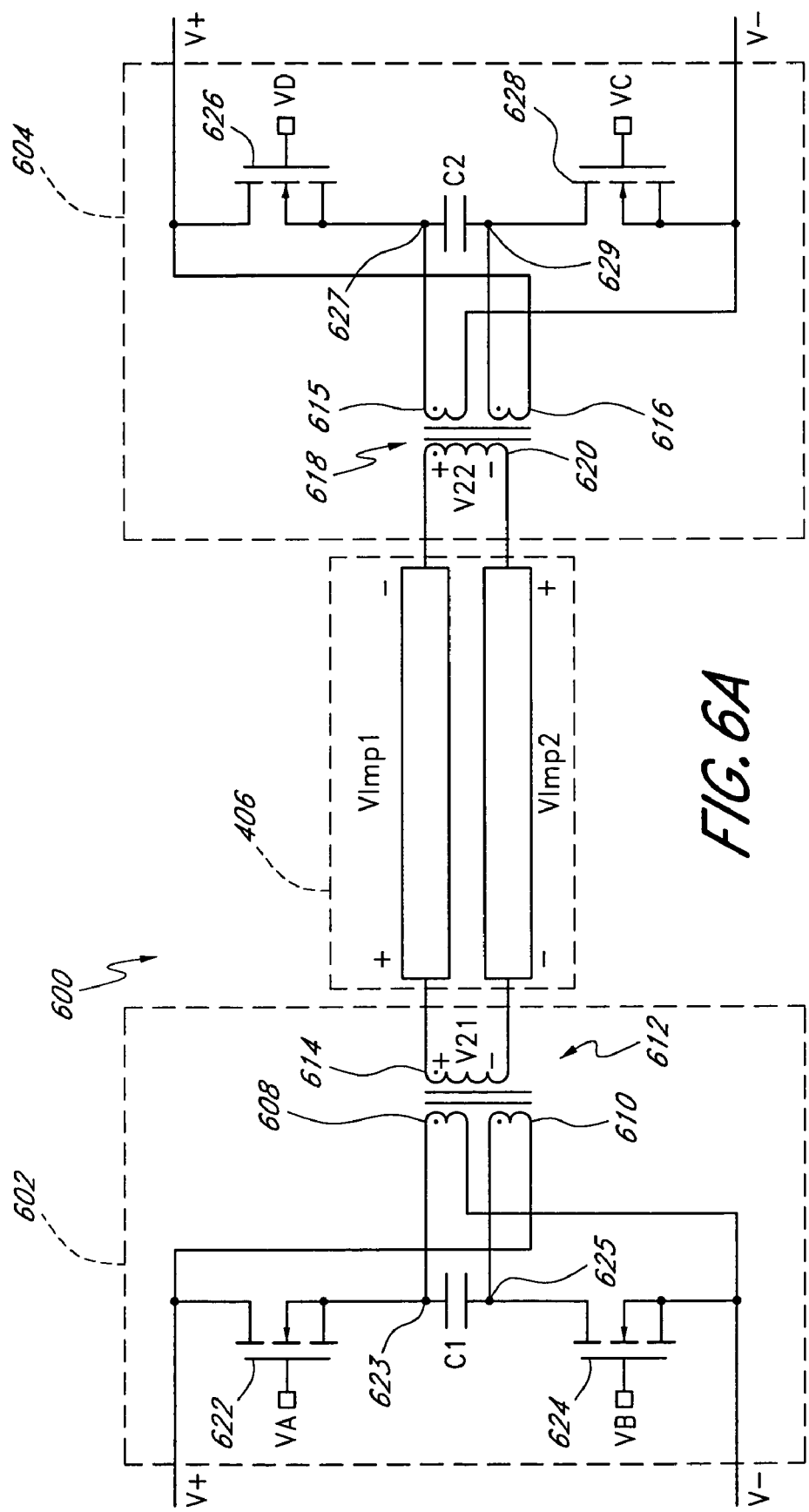
FIG. 6A illustrates one embodiment of a split inverter using push-pull forward inverter arms.
Figure 6B:
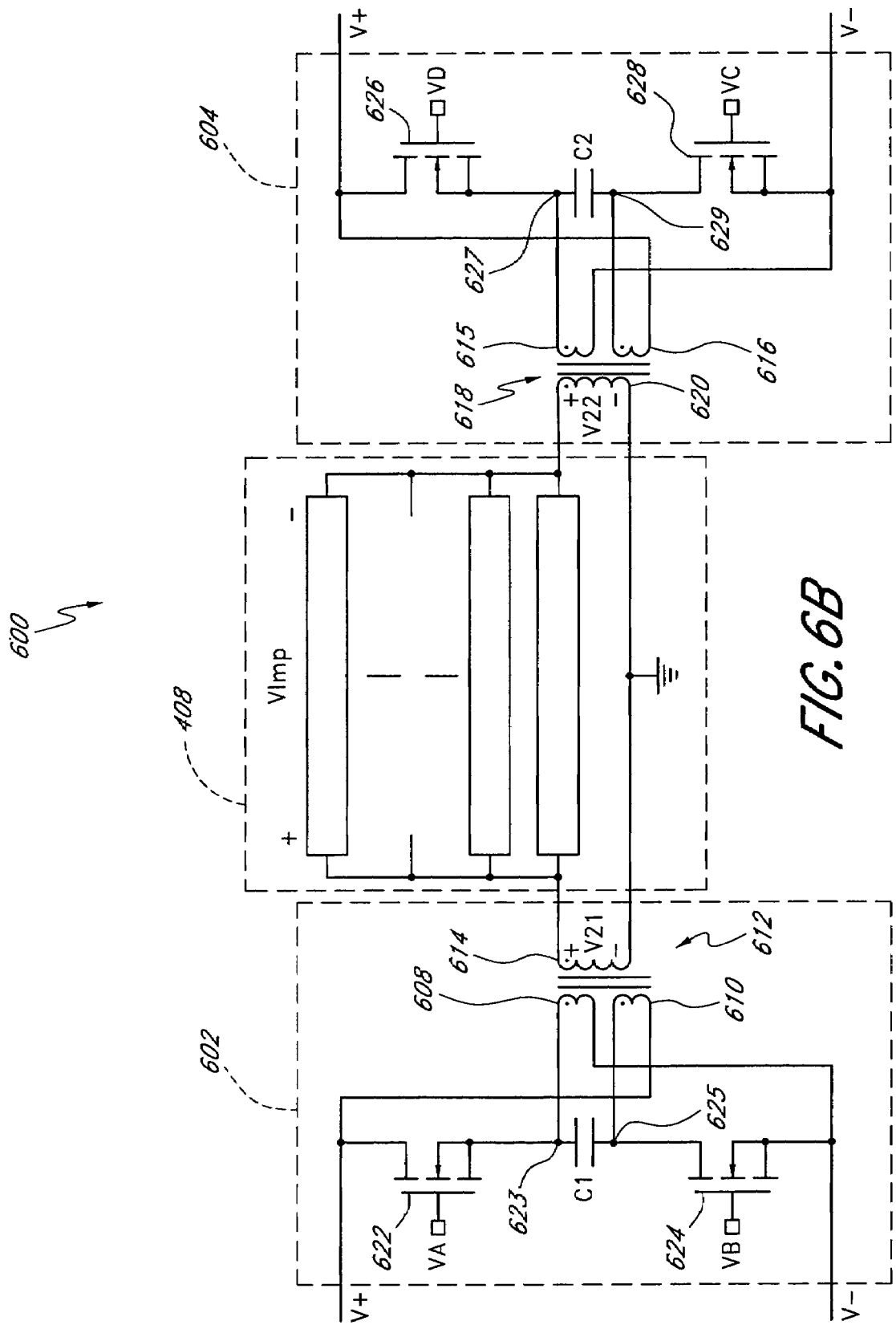
FIG. 6B illustrates another embodiment of a split inverter using push-pull forward inverter arms.

FIGS. 6A and 6B illustrate a split inverter system 600 comprising a first push-pull forward inverter arm 602 and a second push-pull forward inverter arm 604 disposed at opposite ends of a corresponding lamp structure 406 (FIG. 6A) or 408 (FIG. 6B). The lamp structure 406 shown in FIG. 6A is described above with respect to FIG. 4A. The lamp structure 408 shown in FIG. 6B is described above with respect to FIG. 4B.

The first push-pull forward inverter arm 602 comprises a first output transformer 612 having a first primary winding 608, a second primary winding 610 and a secondary winding 614. The first push-pull forward inverter arm 602 is configured to generate a first AC signal V21 across the secondary winding 614 of the first output transformer 612. The second push-pull forward inverter arm 604 comprises a second output transformer 618 having a first primary winding 615, a second primary winding 616, and a secondary winding 620. The second push-pull forward inverter arm 604 is configured to generate a second AC signal V22 across the secondary winding 620 of the second output transformer 618.

The push-pull forward inverter arms 602, 604 use separate primary windings for each switching path. The first push-pull inverter arm 602 comprises a first semiconductor switch (e.g., N-channel MOSFET) 622 coupled between a positive supply voltage V+ and a first terminal of the first primary winding 608 at switching node 623. A second terminal of the first primary winding 608 is coupled to a negative supply voltage V−. Thus, when the first semiconductor switch 622 is conducting, current flows through the first primary winding 608. The first push-pull inverter arm 602 further comprises a second semiconductor switch (e.g., N-channel MOSFET) 624 coupled between the negative supply voltage V− and a first terminal of the second primary winding 610 at switching node 625. A second terminal of the second primary winding 610 is coupled to the positive supply voltage V+. Thus, when the second semiconductor switch 624 is conducting, current flows through the second primary winding 610. A floating capacitor (C1) is coupled between the switching nodes 623, 625 to absorb voltage spikes due to parasitic inductance in the power supply lines V+, V−.

The second push-pull inverter arm 604 comprises a third semiconductor switch (e.g., N-channel MOSFET) 626 coupled between the positive supply voltage V+ and a first terminal of the first primary winding 615 at switching node 627. A second terminal of the first primary winding 615 is coupled to the negative supply voltage V−. Thus, when the third semiconductor switch 622 is conducting, current flows through the first primary winding 615. The second push-pull inverter arm 604 further comprises a fourth semiconductor switch (e.g., N-channel MOSFET) 628 coupled between the negative supply voltage V− and a first terminal of the second primary winding 616 at switching node 629. A second terminal of the second primary winding 616 is coupled to the positive supply voltage V+. Thus, when the fourth semiconductor switch 628 is conducting, current flows through the second primary winding 616. A floating capacitor (C2) is coupled between the switching nodes 627, 629 to absorb voltage spikes due to parasitic inductance in the power supply lines V+, V−.

The gates of the first MOSFET 622 and the second MOSFET 624 receive control signals VA, VB from a controller (not shown) configured to drive the first push-pull forward inverter arm 602 so as to generate the first AC signal V21. Similarly, the gates of the third MOSFET 626 and the fourth MOSFET 628 receive control signals VC, VD from the same controller configured to drive the second push-pull forward inverter arm 604 so as to generate the second AC signal V22. While separate controllers can be used to drive the first push-pull forward inverter arm 602 and the second push-pull forward inverter arm 604, in a preferred embodiment a common controller drives both arms 602, 604. Thus, the size and cost of the split inverter system 600 are reduced and the characteristics of the first AC signal V21 and the second AC signal V22 can be adjusted relative to each other.

Although N-channel MOSFET devices are depicted in FIGS. 4A–6B, other switching devices (e.g., P-channel MOSFETs, n-type bipolar junction transistors (BJTs), p-type BJTs, etc.) are applicable with the same principle. By way of example and not by limitation, an artisan will recognize from the disclosure herein that the high side N-channel MOSFETs in FIGS. 4A–6B (i.e., MOSFETs 422, 426, 522, 526, 622 and 626) can be replaced by P-channel devices to simplify the gate drive circuit design.

In certain embodiments, the inverter arms 402, 404, 502, 504, 602, 604 shown in FIGS. 4A–6B operate in a complementary switching pattern. Regulation of the lamp current is achieved by adjusting the phase angle between the outputs of the inverter arms or by symmetrically varying the pulse widths of the respective outputs of the inverter arms. Referring to FIG. 4A, for example, if the transformers 412, 418 are substantially similar and the two inverter arms 402, 404 share substantially the same input voltage, the first AC signal V21 and the second AC signal V22 cancel each other when their switching states are in phase. Similarly, the first AC signal V21 and the second AC signal V22 stack up to drive the lamps 430, 432 to the extent the switching states are out of phase (or anti-phase).

Figure 7:
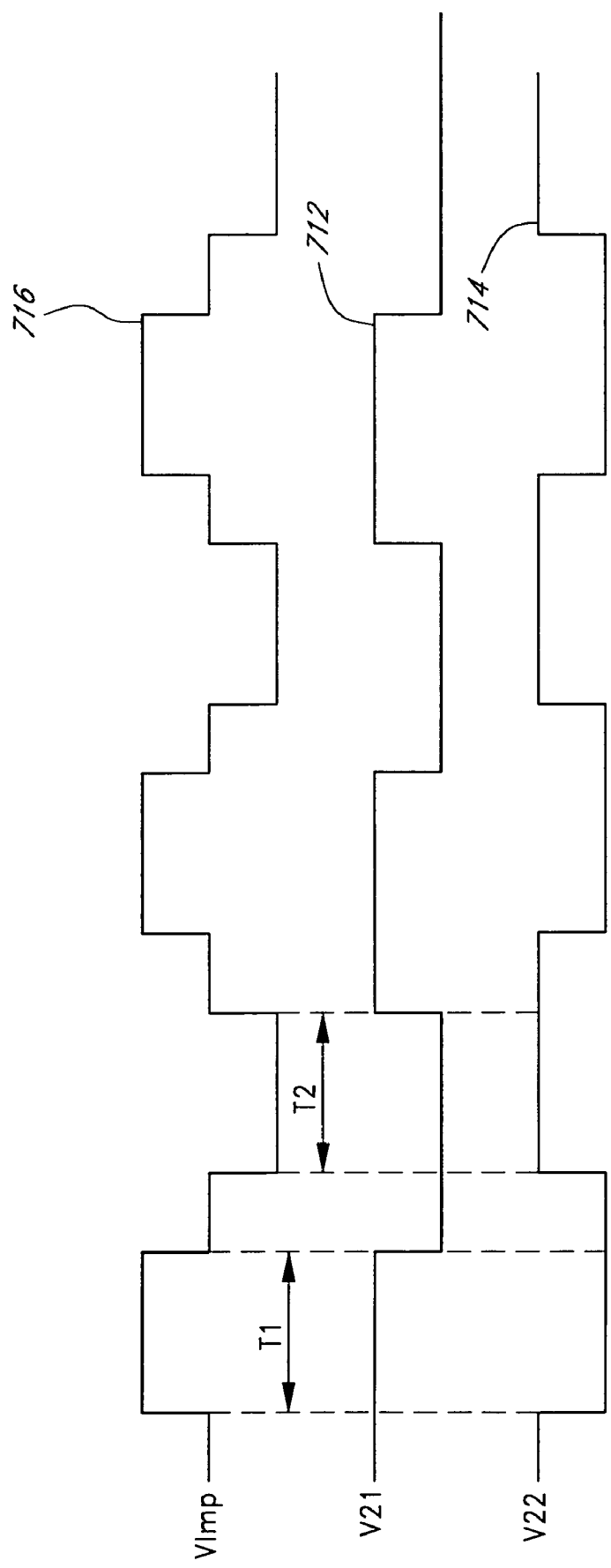
FIG. 7 illustrates waveforms of various voltages of a split inverter using a phase shifted control scheme.

FIG. 7 illustrates various voltages in a phase shifted control scheme according to an embodiment of the invention usable by a split inverter system such as the split inverter systems 400, 500, 600 shown in FIGS. 4A–6B. The output voltages (V21, V22) 712, 714 of the split inverter arms combine to generate a lamp voltage 716 (Vlmp) across a lamp structure. Referring to FIG. 4A, for example, the first output voltage 712 is generated across the secondary winding 414 of the first transformer 412 as the first AC voltage V21. Similarly, the second output voltage 714 is generated across the secondary winding 420 of the second transformer 418 as the second AC voltage V22.

The first output voltage 712 and the second output voltage 714 add differentially to generate the lamp output voltage (Vlmp=Vlmp1+Vlmp2) 716 across the first CCFL 430 and the second CCFL 432. If the lamp structure 408 shown in FIG. 4B is used, for example, then the lamp voltage (Vlmp) corresponding to the lamp output voltage 716 is generated across the parallel lamps 434, 436, 438.

The first AC voltage V21 is generated across the secondary winding 414 of the first transformer 412 by applying the control signal VA to the gate of the first MOSFET 422 and the control signal VB to the gate of the second MOSFET 424. The control signal VA has substantially the same shape as the first output voltage 712. The control signal VB is substantially an inversion of the control signal VA with appropriate dead time inserted to facilitate zero-voltage switching. The second AC voltage V22 is generated across the secondary winding 420 of the second transformer 418 by applying the control signal VC to the gate of the fourth MOSFET 428 and the control signal VD to the gate of the third MOSFET 426. The control signal VD has substantially the same shape as the second output voltage 714. The control signal VC is substantially an inversion of the control signal VD with appropriate dead time inserted to facilitate zero-voltage switching.

A common controller advantageously generates the control signals VA, VB, VC, VD for both inverter arms 402, 404. In some embodiments of the phase shift modulation scheme, the two inverter arms 402, 404 are switched at approximately a 50% duty cycle. The effective lamp voltage (Vlmp) across the lamps 430, 432 varies with the phase difference between the first output voltage 712 and the second output voltage 714. By adjusting the phase difference between the two inverter arms 402, 404, the positive pulse widths T1 and the negative pulse widths T2 of the lamp voltage 716 and the corresponding lamp current through the lamps 430, 432 are regulated.

Figure 8:
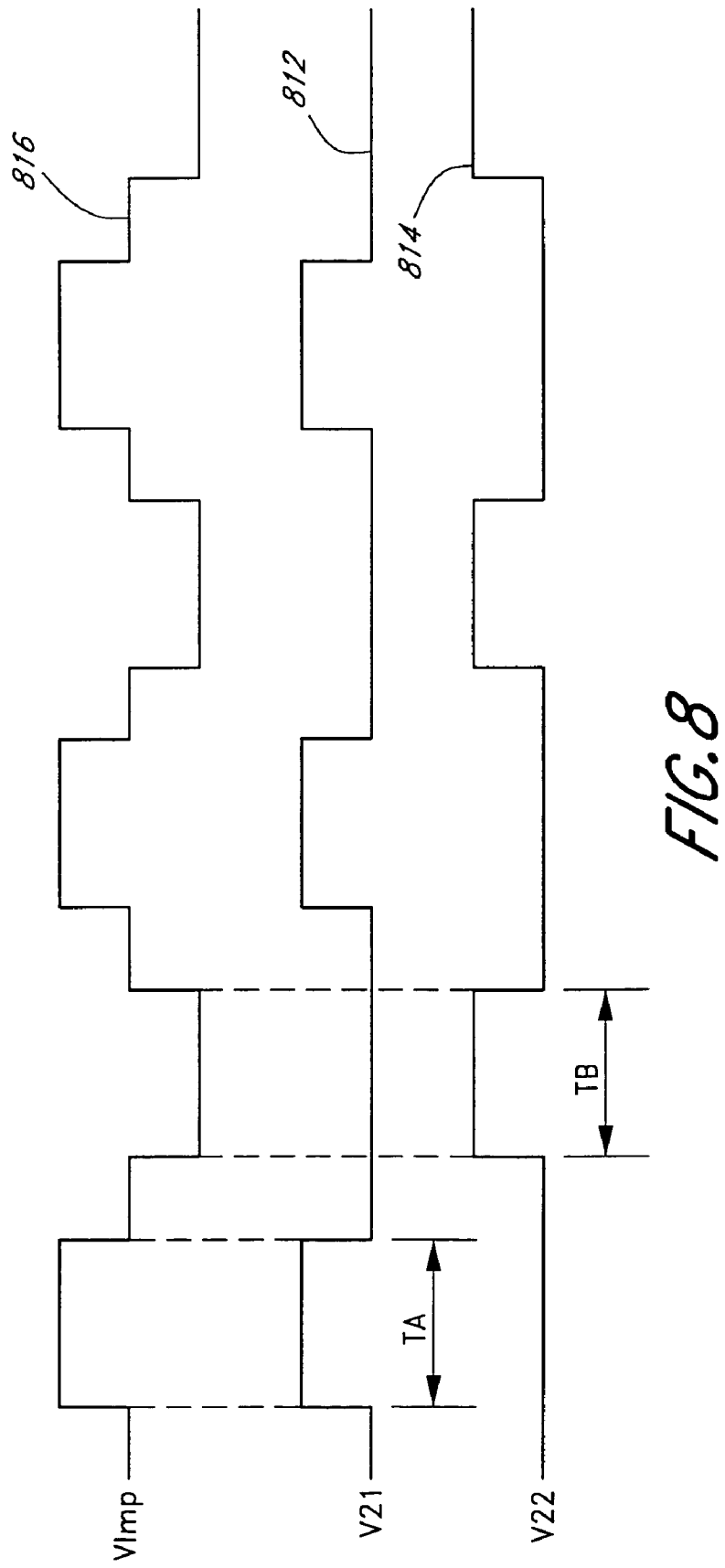
FIG. 8 illustrates waveforms of various voltages of a split inverter using a symmetric pulse width modulation scheme.

FIG. 8 illustrates various voltages in a pulse width modulation scheme according to an embodiment of the invention usable by a split inverter system such as the split inverter system 400 shown in FIGS. 4A and 4B. The output voltages 812, 814 (V21, V22) of the split inverter arms combine to generate a lamp voltage (Vlmp) 816 across a lamp structure. The effective lamp voltage (Vlmp) varies with the pulse widths TA, TB of the output voltages 812, 814. Thus, the lamp current can be regulated by symmetrically adjusting the pulse widths TA, TB of the output voltages 812, 814.

Referring to FIG. 4A, for example, the first output voltage 812 is generated across the secondary winding 414 of the first transformer 412 as the first AC voltage V21. Similarly, the second output voltage 814 is generated across the secondary winding 420 of the second transformer 418 as the second AC voltage V22. The first output voltage 812 and the second output voltage 814 add differentially to generate the lamp voltage (Vlmp=Vlmp1+Vlmp2) 816 across the first CCFL 430 and the second CCFL 432. If the lamp structure 408 shown in FIG. 4B is used, for example, then the lamp voltage (Vlmp) corresponding to the lamp voltage 816 is generated across the parallel lamps 434, 436, 438.

The first AC voltage V21 is generated across the secondary winding 414 of the first transformer 412 by applying the control signal VA to the gate of the first MOSFET 422 and the control signal VB to the gate of the second MOSFET 424. The control signal VA has substantially the same shape as the first output voltage 812. The control signal VB is substantially an inversion of the control signal VA with appropriate dead time inserted to facilitate zero-voltage switching. The second AC voltage V22 is generated across the secondary winding 420 of the second transformer 418 by applying the control signal VC to the gate of the fourth MOSFET 428 and the control signal VD to the gate of the third MOSFET 426. The control signal VD has substantially the same shape as the second output voltage 814. The control signal VC is substantially an inversion of the control signal VD with appropriate dead time inserted to facilitate zero-voltage switching.

In one embodiment, an optimized dead time is inserted at the switch over transition to avoid shoot through conditions. Referring to FIG. 4A, for example, when the first MOSFET 422 is conducting, the switching node S1 is clamped to the first DC voltage signal V+. When the first MOSFET 422 is turned off (i.e., not conducting), the stored inductive energy maintains the original inductive current flowing direction, thereby charging and discharging the source-drain capacitance of the first MOSFET 422 and the second MOSFET 424 in addition to other parasitic capacitance.

In CCFL inverter applications, the transformer leakage inductance is normally large enough to yield sufficient stored energy at normal operating conditions to fully charge and discharge the parasitic capacitance, thereby swinging the potential of the switching node S1 to the opposite or negative DC rail (i.e., the value of the second DC voltage signal V−). During this period, the voltage across the second MOSFET 424 reduces from fill DC input towards zero and is clamped at zero until the inductive energy is exhausted. If the second MOSFET 424 is turned on at the moment the switching node S1 reaches the negative DC rail potential, zero-voltage switching is accomplished.

In one embodiment, a dead time is inserted to delay the turn on of the second MOSFET 424 for a short while after the first MOSFET 422 is turned off and until the switching node S1 reaches the negative DC rail potential, and vice versa. Correspondingly, the second half-bridge inverter arm 404 with MOSFETS 426, 428 operates in a similar manner to MOSFETs 422, 424. Similar principles to achieve zero-voltage switching apply to circuit configurations shown in FIGS. 4B–6B.

Figure 9:
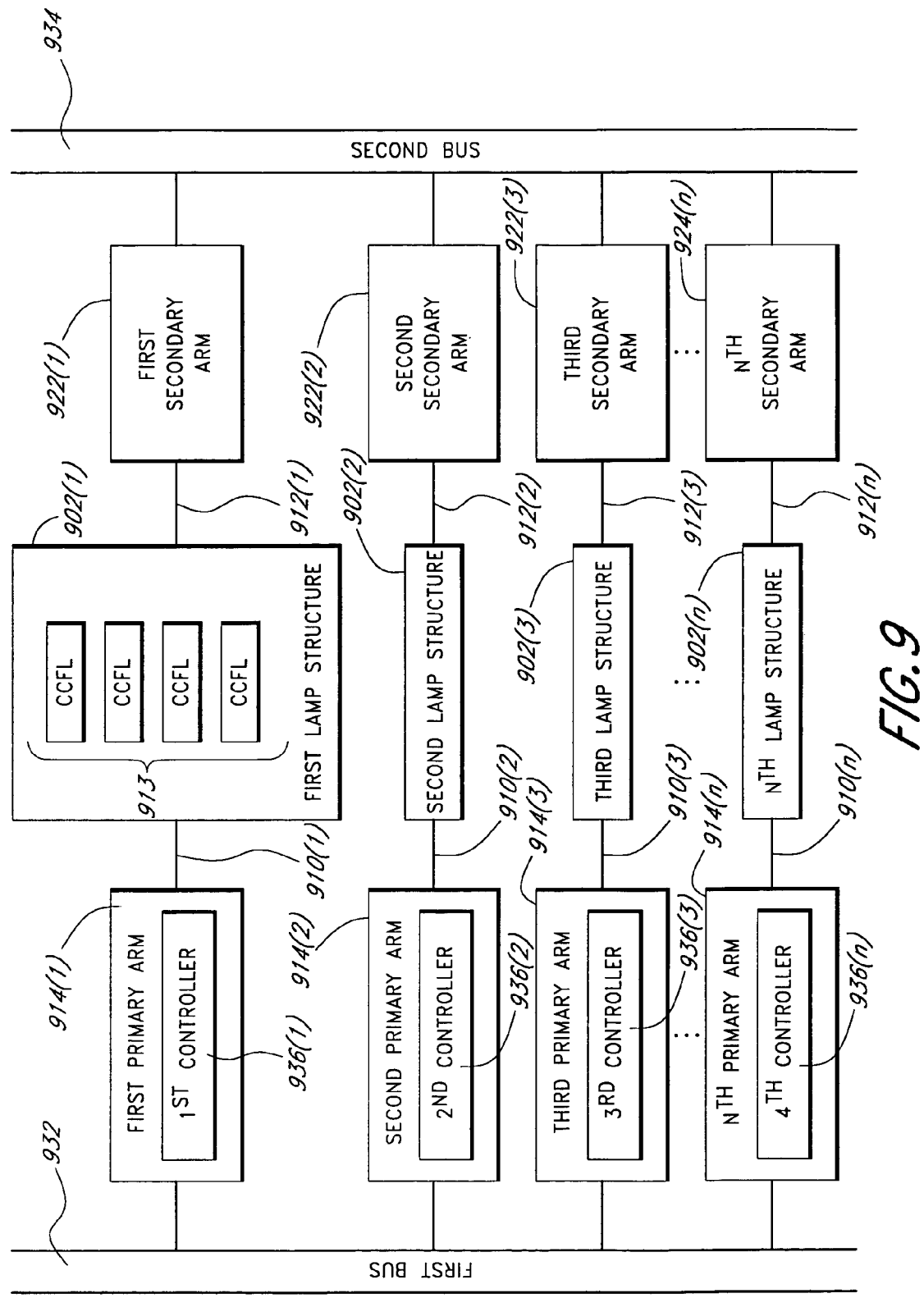
FIG. 9 is a block diagram of a backlighting system according to an embodiment of the invention.

FIG. 9 is a block diagram of a backlighting system according to an embodiment of the invention. The backlighting system comprises n lamp structures, shown as 902(1)–902(n) (collectively the lamp structures 902). The lamp structures 902 have respective first terminals, shown as 910(1)–910(n) (collectively the first terminals 910), and respective second terminals, shown as 912(1)–912(n) (collectively the second terminals 912). For illustrative purposes, a plurality of CCFLs 913 (four shown) are shown for the first lamp structure 902(1). It should be understood, however, that each of the lamp structures 902 comprise one or more fluorescent lamps.

The backlighting system further comprises n primary circuit boards, shown as 914(1)–914(n) (collectively the primary circuit boards 914). The primary circuit boards 914 comprise respective primary inverter arms which are co-located with controllers, shown as 936(1)–936(n) (collectively the controllers 936). The primary circuit boards 914 are respectively coupled to the first terminals 910 and thus, the primary inverter arms are respectively located proximate to the first terminals 910. The backlighting system also comprises n secondary inverter arms on respective secondary circuit boards, shown as 922(1)–922(n) (collectively the secondary circuit boards 922). The secondary circuit boards 922 are respectively coupled to the second terminals 912 and thus, the secondary inverter arms are respectively located proximate to the second terminals. The secondary circuit boards 922 are located distal to the controllers 936.

The primary inverter arms and the secondary inverter arms are configured to convert a DC voltage signal to an AC voltage signal that is then provided to the respective first terminals 910 and the respective second terminals 912. The controllers 936 are configured to symmetrically drive the first terminals 910 and the second terminals 912 of the respective lamp structures 902 in a split inverter configuration as described above. For example, the first controller 936(1) is configured to symmetrically control the power conversion of the first primary inverter arm on the first primary circuit board 914(1) and the first secondary inverter arm on the first secondary circuit board 922(l) to drive the first lamp structure 902(1).

The controllers 936 are configured to communicate control signals (not shown) to their respective primary inverter arms on the primary circuit boards 914 and secondary inverter arms on the secondary circuit boards 922. The controllers 936 communicate with the secondary circuit boards 922 via a connection (not shown) from a first bus 932 to a second bus 934. Since the controllers 936 drive both of the primary inverter arms and secondary inverter arms, the number of components, size and cost of the backlighting system are reduced. Further, the split inverter arms allow high current or high voltage switching signals to be provided to the respective first terminals 910 and second terminals 912 without crossing the lamp structures 902 or substantial portions thereof.

In one embodiment, one of the controllers 936 is configured as a master controller and the remaining n−1 controllers 936 are configured as slave controllers. The master controller communicates with the slave controllers through the first bus 932 and synchronizes the lamp current and frequency regulated by each of the controllers 936.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An inverter comprising:
   a first transformer;
   a second transformer, wherein a lamp structure is coupled in a floating configuration between a secondary winding of the first transformer and a secondary winding of the second transformer;
   a first two-switch network configured to generate a first alternating current signal across a primary winding of the first transformer;
   a second two-switch network configured to generate a second alternating current signal across a primary winding of the second transformer; and
   a controller configured to control the first two-switch network and the second two-switch network, wherein at least one of the first two-switch network and the second two-switch network is controlled by a first control signal and an inverted version of the first control signal with dead time inserted at transitions between switching states.

2. The inverter of claim 1, wherein the first two-switch network and the second two-switch network have respective topologies selected from the group comprising a half-bridge configuration, a push-pull configuration, and a push-pull forward configuration.

3. The inverter of claim 1, wherein the controller is configured to symmetrically adjust pulse widths of the first alternating current signal and the second alternating current signal.

4. The inverter of claim 1, wherein the controller is configured to adjust a phase difference between the first alternating current signal and the second alternating current signal.

5. The inverter of claim 4, wherein the first alternating current signal and the second alternating current signal, respectively, have approximately fifty percent duty cycles.

6. The inverter of claim 1, wherein the lamp structure comprises a first fluorescent lamp coupled between a first terminal of the secondary winding of the first transformer and a first terminal of the secondary winding of the second transformer.

7. An inverter comprising:
   a first transformer;
   a second transformer, wherein a lamp structure is coupled in a floating configuration between a secondary winding of the first transformer and a secondary winding of the second transformer, and the lamp structure comprises:
      a first fluorescent lamp coupled between a first terminal of the secondary winding of the first transformer and a first terminal of the secondary winding of the second transformer; and
      a second fluorescent lamp coupled between a second terminal of the secondary winding of the first transformer and a second terminal of the secondary winding of the second transformer;
   a first two-switch network configured to generate a first alternating current signal across a primary winding of the first transformer;
   a second two-switch network configured to generate a second alternating current signal across a primary winding of the second transformer; and
   a controller configured to control the first two-switch network and the second two-switch network.

8. The inverter of claim 6, further comprising at least a second fluorescent lamp coupled in parallel with the first fluorescent lamp.

9. The inverter of claim 8, wherein a second terminal of the secondary winding of the first transformer is coupled to a second terminal of the secondary winding of the second transformer.

10. The inverter of claim 9, wherein the second terminal of the secondary winding of the first transformer is grounded.

11. An inverter comprising:
   a first power transformer;
   a second power transformer, wherein at least one lamp is coupled between the first power transformer and the second power transformer;
   split switching arms, wherein one of the split switching arms is dedicated to the first power transformer and another of the split switching arms is dedicated the second power transformer; and
   a controller to control the split switching arms to produce symmetric alternating current (AC) waveforms in the first and second power transformers to drive the at least one lamp, wherein at least one of the split switching arms is controlled by a first control signal and an inverted version of the first control signal with dead time inserted at transitions between switching states.

12. The inverter of claim 11, wherein each of the split switching arms comprises a two-switch network.

13. The inverter of claim 12, wherein the first and second power transformers each comprises a primary winding, and wherein the two-switch network is a half-bridge network comprising:
   two transistors coupled in series across a supply voltage, wherein the two transistors are interconnected at a switching node; and
   a capacitor coupled to the switching node, wherein the capacitor is configured to AC couple the switching node to the primary winding.

14. An inverter comprising:
   a first power transformer;
   a second power transformer, wherein at least one lamp is coupled between the first power transformer and the second power transformer;
   split switching arms, wherein one of the split switching arms is dedicated to the first power transformer and another of the split switching arms is dedicated the second power transformer and wherein each of the split switching arms comprises a two-switch network;
   a controller to control the split switching arms to produce symmetric alternating current (AC) waveforms in the first and second power transformers to drive the at least one lamp; and
   wherein at least one of the first and second power transformers comprise a primary winding having a center tap coupled to a first direct-current (DC) voltage signal, and wherein the two-switch network is a push-pull network comprising:
      a first transistor coupled between a second DC voltage signal and a first terminal of the primary winding; and
      a second transistor coupled between the second DC voltage signal and a second terminal of the primary winding.

15. An inverter comprising:
   a first power transformer;
   a second power transformer, wherein at least one lamp is coupled between the first power transformer and the second power transformer;
   split switching arms, wherein one of the split switching arms is dedicated to the first power transformer and another of the split switching arms is dedicated the second power transformer and wherein each of the split switching arms comprises a two-switch network;

a controller to control the split switching arms to produce symmetric alternating current (AC) waveforms in the first and second power transformers to drive the at least one lamp; and wherein at least one of the first and second power transformers comprise a first primary winding and a second primary winding, and wherein the two-switch network is a push-pull forward network comprising:

a first semiconductor switch coupled between a first direct-current (DC) voltage signal and a first terminal of the first primary winding, wherein a second terminal of the first primary winding is coupled to a second DC voltage signal; and a second semiconductor switch coupled between the second DC voltage signal and a first terminal of the second primary winding, wherein a second terminal of the second primary winding is coupled to the first DC voltage signal.

16. The inverter of claim 15, wherein the push-pull forward network further comprises a capacitor coupled between the first terminal of the first primary winding and the first terminal of the second primary winding.

17. A method for driving a lamp, the method comprising:
driving a first terminal of a lamp with a first dedicated two-switch network, wherein the first dedicated two-switch network is controlled by a first control signal and an inverted version of the first control signal with dead time inserted at transitions between switching states;

driving a second terminal of the lamp with a second dedicated two-switch network, wherein the second dedicated two-switch network is controlled by a second control signal and inverted version of the second control signal with dead time inserted at transitions between switching states; and symmetrically controlling the first dedicated two-switch network and the second dedicated two-switch network using a common controller.

18. The method of claim 17, wherein driving the first terminal and the second terminal of the lamp comprises phase-shift modulating a first signal provided to the first terminal relative to a second signal provided to the second terminal.

19. The method of claim 17, wherein driving the first terminal and the second terminal of the lamp comprises pulse-width modulating a first signal provided to the first terminal and a second signal provided to the second terminal, wherein the first signal and the second signal are substantially symmetrically pulse-width modulated with respect to each other.

20. A backlighting system comprising:
a first lamp structure having a first end and a second end;
a first two-transistor network dedicated to providing a first alternating current (AC) signal to the first end;
a second two-transistor network dedicated to providing a second AC signal to the second end; and
a first controller coupled to the first two-transistor network and the second two-transistor network, the first controller configured to correlate the waveform relations between the first AC signal and the second AC signal, and wherein at least one of the first two-transistor network and the second two-transistor network is controlled by a first control signal and an inverted version of the first control signal with dead time inserted at switch-over transitions between switching states.

21. The backlighting system of claim 20, wherein the first lamp structure comprises at least one cold cathode fluorescent lamp.

22. The backlighting system of claim 21, wherein the at least one cold cathode fluorescent lamp is in a floating configuration.

23. A backlighting system comprising:
a first lamp structure having a first end and a second end;
a first two-transistor network dedicated to providing a first alternating current (AC) signal to the first end;
a second two-transistor network dedicated to providing a second AC signal to the second end;
a first controller coupled to the first two-transistor network and the second two-transistor network, the first controller configured to correlate the waveform relations between the first AC signal and the second AC signal;
a second controller in communication with the first controller, wherein the first controller is configured to control the second controller;
a second lamp structure;
a third two-transistor network dedicated to providing a third AC signal to the second lamp structure; and
a fourth two-transistor network dedicated to providing a fourth AC signal to the second lamp structure, wherein the second controller is configured to correlate the waveform relations between the third AC signal and the fourth AC signal based at least in part on the first controller.

* * * * *